United States Patent
Brand

(10) Patent No.: US 7,412,098 B2
(45) Date of Patent: Aug. 12, 2008

(54) METHOD FOR GENERATING A LOW-DIMENSIONAL REPRESENTATION OF HIGH-DIMENSIONAL DATA

(75) Inventor: Matthew E. Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 890 days.

(21) Appl. No.: 10/932,791

(22) Filed: Sep. 2, 2004

(65) Prior Publication Data

US 2006/0045353 A1    Mar. 2, 2006

(51) Int. Cl.
G06K 9/62 (2006.01)
G06K 9/66 (2006.01)
G06K 9/00 (2006.01)

(52) U.S. Cl. .................. 382/224; 382/225; 382/190; 382/168

(58) Field of Classification Search ................ 382/168, 382/224, 225
See application file for complete search history.

(56) References Cited

U.S. PATENT DOCUMENTS

2002/0065664 A1* 5/2002 Witzgall et al. ............. 704/500

2004/0107079 A1* 6/2004 MacAuslan .................... 703/2

OTHER PUBLICATIONS

"A new LDA-based face recognition system which can solve the small sample size problem;" Chen et. al., pattern Recognition vol. 33, Issue 10; Oct. 2000, p. 1713-1726.*
Tenenbaum, et al., "*A global geometric framework for nonlinear dimensionality reduction*," Science, 290:2319-2323, Dec. 2000.
Weinberger, et al., "*Learning a kernel matrix for nonlinear dimensionality reduction*," Proc. 21st ICML, 2004.
Brand, "*Charting a manifold*," Advances in Neural Information Processing Systems, vol. 15, 2003.
Golub, et al., "Matrix Computations," 3$^{rd}$ Edition, The Johns Hopkins University Press, 1996, p. 601.

* cited by examiner

*Primary Examiner*—Jingge Wu
*Assistant Examiner*—Yeu-Tzer Chou
(74) *Attorney, Agent, or Firm*—Dirk Brinkman; Clifton D. Mueller; Gene V. Vinokur

(57) ABSTRACT

A method represents a class of objects. A set of samples for the objects in the class is acquired, there being one sample for each object, and each sample includes a plurality of data values representing characteristics of the object. The samples are grouped into subsets such that each subset intersects at least one other subset. For each subset, a low-dimensional parameterization is determined. Nullspaces of the low-dimensional parameterizations are averaged to obtain a matrix whose nullspace contains a low-dimensional representation of the class of objects.

7 Claims, 2 Drawing Sheets

METHOD FOR GENERATING A LOW-DIMENSIONAL REPRESENTATION OF HIGH-DIMENSIONAL DATA

FIELD OF THE INVENTION

The invention relates generally to modeling sampled data, and more particularly, to representing high-dimensional data with a low-dimensional model.

BACKGROUND OF THE INVENTION

Nonlinear dimensionality reduction (NLDR) generates a low-dimensional representation of high-dimensional sample data. The data are presumed to sample a d dimensional manifold $\widehat{x_i - x}$ that is embedded in an ambient space $\Re^D$, with D>d. The goal is to separate the extrinsic geometry of the embedding, i.e., how the manifold $\widehat{x_i - x}$ is shaped in the ambient space $\Re^D$, from its intrinsic geometry, i.e., the native d-dimensional coordinate system of the manifold $\widehat{x_i - x}$.

For example, if it is known how a manifold of human faces is embedded in a space of image of the faces, the intrinsic geometric can be used to edit, compare, and classify images of faces, while the extrinsic geometry can be exploited to detect faces in images and synthesize new face images.

In computer vision it is common to approximate the manifold with linear subspaces fitted to sample images via principal components analysis (PCA). Although this is an approximation, it has been applied successfully for data interpolation, extrapolation, compression, denoising, and visualization.

NLDR "submanifold" methods can offer the same functionality, but with more fidelity to the true data distribution, because most of the operations are exclusive to the intrinsic or extrinsic geometry of the manifold $\widehat{x_i - x}$.

Where PCA methods preserve a global structure of the manifold, i.e., a covariance about the data mean, NLDR methods preserve local structures in the manifold. Differential geometry teaches that local metrics on infinitesimal neighborhood of data and information about the connectivity of the neighborhoods fully determines the intrinsic geometry of the manifold.

This is approximated for finite data by imposing a neighborhood graph on the data and measuring relations between neighboring points in graph subsets.

The prior art describes imposing a neighborhood graph on the data and measuring relations between neighboring points in graph subsets for point-to-point distances, see, e.g., Tenenbaum, et al., "*A global geometric framework for nonlinear dimensionality reduction*," Science, 290:2319-2323, December 2000, Weinberger, et al., "*Learning a kernel matrix for nonlinear dimensionality reduction*," Proc. 21st ICML, 2004, and Belkin et al., "*Laplacian eigenmaps for dimensionality reduction and data representation*," Advances in Neural Information Processing Systems, volume 14, 2002.

Measuring relations between neighboring points in graph subsets has also been described for coordinates of points projected into a local tangent space, see, Brand, "*Charting a manifold*," Advances in Neural Information Processing Systems, volume 15, 2003, Donoho et al., "*Hessian eigenmaps*," Proceedings, National Academy of Sciences, 2003, and Zhang et al., "*Nonlinear dimension reduction via local tangent space alignment*," Proceedings, Conf. on Intelligent Data Engineering and Automated Learning, number 2690 in Lecture Notes on Computer Science, Springer-Verlag, pages 477-481, 2003.

Measuring relations between neighboring points in graph subsets has further been described for local barycentric coordinates, see, Roweis, et al., "*Nonlinear dimensionality reduction by locally linear embedding*," Science, 290:2323-2326, December 2000.

A key assumption in prior art is that local linear structure of point subsets in the ambient space can approximate a metric structure in corresponding neighborhoods on the manifold $\widehat{x_i - x}$, i.e., distances in ambient space $\Re^D$ stand for geodesic arc-lengths on the manifold $\widehat{x_i - x}$. The graph then guides the combination of all local metric constraints into a quadratic form where maximizing or minimizing eigenfunctions provide a minimum squared error basis for embedding the manifold in the target space $\Re^d$.

For discrete data, the quadratic form is a Gram matrix with entries that can be interpreted as inner products between points in an unknown space where the manifold is linearly embedded, therefore NLDR is a kernel method, albeit with unknown kernel function, see, Ham, et al., "*A kernel view of the dimensionality reduction of manifolds*," Proc. ICML04, 2004.

Of particular interest for signal processing and data modeling is the case where a sampled patch in the manifold $\widehat{x_i - x}$ is locally isometric to a connected patch of the target space $\Re^d$. Because in the continua limit of infinite sampling, optimizing eigenfunctions yields a flat immersion that perfectly reproduces the local data density and intrinsic geometry of the manifold, see, Donoho et al., "*Hessian eigenmaps*," Proceedings, National Academy of Sciences, 2003. Thus, most NLDR embedding methods strive for isometry.

NLDR is derived from graph embeddings, see, e.g., Tutte, "*Convex representations of graphs*," Proc. London Mathematical Society, 10:304-320, 1960, Tutte, "*How to draw a graph*," Proc. London Mathematical Society, 13:743-768, 1963, Fiedler, "*Algebraic connectivity of graphs*," Czechoslovak Mathematics Journal, 23:298-305, 1973, Fiedler, "*Algebraic connectivity of graphs*," Czechoslovak Mathematics Journal, 23:298-305, 1973, and Chung, "*Spectral graph theory*," CBMS Regional Conference Series in Mathematics, volume 92, American Mathematical Society, 1997.

Recent advance in machine learning are based on the insight that dimensionality reduction can be applied in the graph-embedding framework by estimating a graph and local metric constraints to cover datasets of unorganized points, see, Tenenbaum et al., Roweis et al., Brand, Belkin et al., and Donoho, et al., above. Applying NLDR in the graph-embedding framework presents two problems:

1. Local metric constraints are systematically distorted because data drawn from an extrinsically curved manifold are locally nonlinear at any finite scale. Therefore, distances in the ambient space $\Re^D$ are biased approximations of geodesic arc-lengths on the manifold $\widehat{x_i - x}$.
2. If the local estimated metric constraints contain any errors, the global solution has a minimum mean squared error (MMSE) with respect to a system of neighborhoods instead of an actual empirical data distribution.

Accordingly, the results of prior art NLDR methods are inconsistent and unstable, especially under small changes to the connectivity graph, see, Balasubramanian et al., "*The IsoMap algorithm and topological stability*," Science, 295 (5552):7, Jan. 2002.

Therefore, it is desired to provide a method for generating a low-dimensional representation of high-dimensional data that improves over the prior art.

SUMMARY OF THE INVENTION

The invention organizes local metric structures of high-dimensional data into a globally consistent isometric immersion in a low-dimensional target space. The invention does this by generating a linearizing operator that averages collected nullspaces of local subset parameterizations. The operator isolates the component of data that is a nonlinear function of the local metric structure, i.e., extrinsic curvature and noise, and defines a spectrum of data transformations that range from local denoising to global dimensionality reduction. Because this operator reduces artifacts due to uneven coverage of the data by the subsets, the immersion has the MMSE property that error, if any, is distributed evenly over the data.

The invention can be used for data reduction, denoising, out-of-sample generalization, and sequential updating with new data points. The invention also has significantly reduced error when compared with prior art NLDR methods.

More specifically, the invention acquires a set of samples for objects in a class of objects, there being one sample for each object, and each sample includes a plurality of data values representing characteristics of the object. The samples are grouped into subsets such that each subset intersects at least one other subset. For each subset, a low-dimensional parameterization is determined and nullspaces of the low-dimensional parameterizations are averaged to obtain a matrix having a nullspace including a low-dimensional representation of the class of objects.

DETAILED DESCRIPTION OF THE PREFERRED EMBODIMENT

Figure 1:
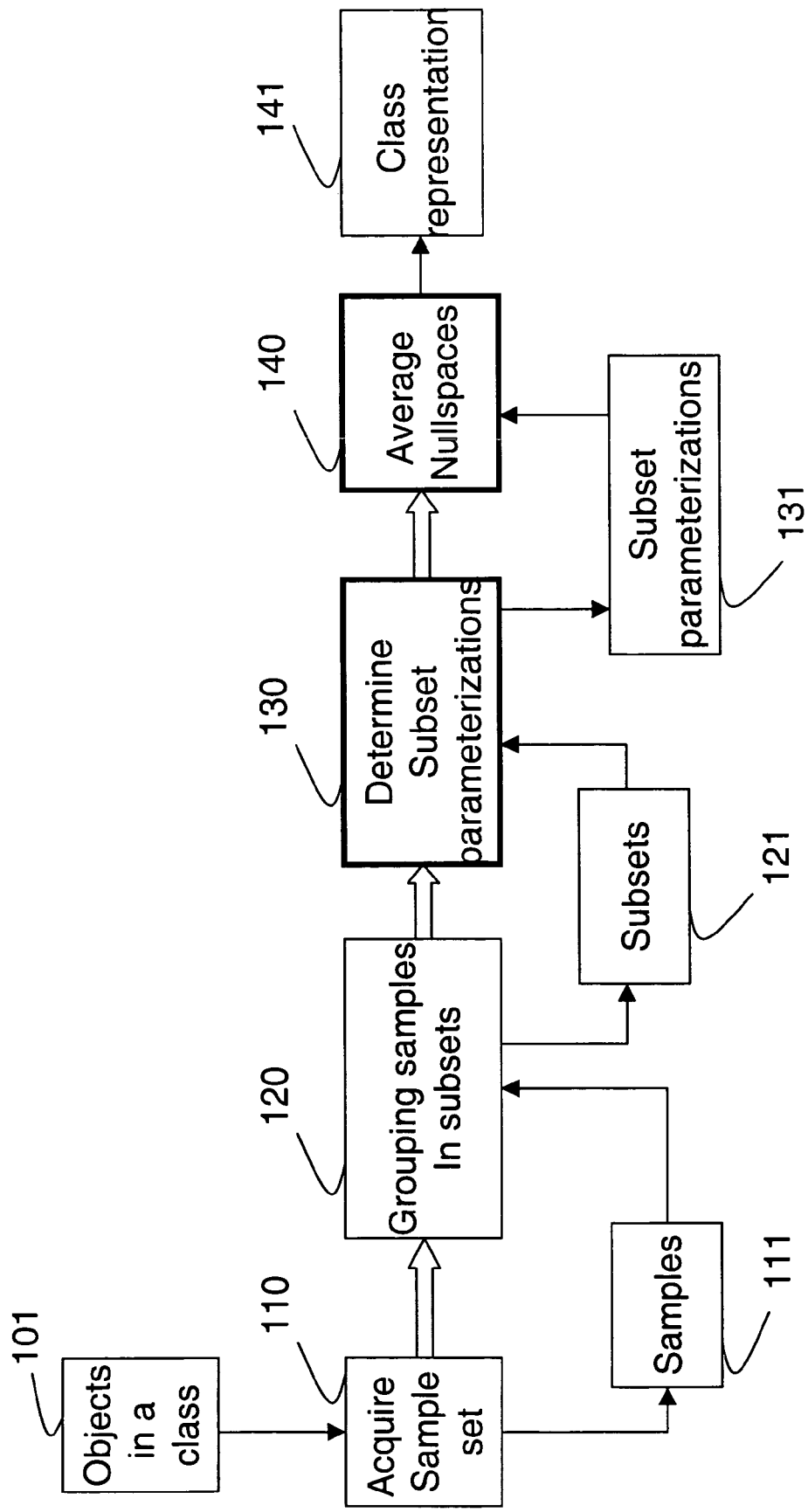
FIG. 1 is a block diagram of a method for representing a class of objects according to the invention.

As shown in FIG. 1, the method 100 according to the invention represents a class of objects 101, for example human faces. A set of samples 111 for the objects in the class is acquired 110. For example, the samples are images of the faces. There is at least one image for each face. Each sample includes multiple of data values representing characteristics of the object, e.g., the pixel color and intensity values in the images. Thus, each sample can include many millions of data values. The data values for each sample are organized as a vector. For images, this can be done by conventional scan line conversion.

The N samples are grouped 120 into M subsets 121 such that each subset intersects at least one other subset. For each subset of samples 121, a low-dimensional parameterization 131 is determined 130. Nullspaces of the low-dimensional parameterizations are averaged 140 to obtain a matrix having a nullspace containing a low-dimensional representation 141 of the class of objects.

Objects in the class in a high-dimensional ambient space $\Re^D$ are sampled from a d dimensional manifold embedded in the ambient space, where D>d. The goal is to separate the extrinsic geometry of the embedding. That is, it is desired to determine the shape of the manifold in the ambient space $\Re^D$ from the intrinsic geometry of the manifold, i.e., the native d-dimensional coordinate system on the manifold.

The manifold is locally isometric to an open subset of a target space $\Re^d$ and embedded in the ambient Euclidean space $\Re^D$>d by an unknown quadratic function $C^2$. The manifold $\tilde{x}$ is a Riemannian submanifold of the ambient space $\Re^D$.

The manifold has an extrinsic curvature in the ambient space $\Re^D$, but a zero intrinsic curvature. However, the isometric immersion of the manifold in the target space $\Re^d$ can have a nontrivial shape with a concave boundary.

The set of samples, represented by $X \doteq [x_1, \ldots, x_N] \in \Re^{D \times N}$, records locations of N samples of the manifold in the ambient space $\Re^D$.

An isometric immersion of the set of samples $Y_{iso} \doteq [y_1, \ldots, y_N] \in \Re^{d \times N}$ eliminates the extrinsic curvature of the set to recover the isometry up to rigid motions in the target space $\Re^d$.

The samples are grouped 120 into subsets so that each subset overlaps with at least one other subset. Each subset having k samples, where k can vary. The grouping 120 is specified by an adjacency matrix $M = [m_1, \ldots, m_M] \in \Re^{N \times M}$ with $M_{nm} > 0$ if and only if the $n^{th}$ point is in the $m^{th}$ subset.

Subset parameterizations $X_m \in \Re^{d \times k}$ 131 are determined 130 for each subset. In the preferred embodiment, the subset parameterizations 131 contain a locally isometric parameterization of the k samples in the $m^{th}$ subset. Euclidean pairwise distances in the parameterizations are equal to geodesic distances on the manifold.

Nullspaces of the isometric low-dimensional parameterizations are averaged 140 to obtain a matrix having a nullspace containing a low-dimensional representation 141 of the class of objects 101.

Global Coordination Via Nullspaces

The averaging 140 generates an immersion error matrix that, after transformation, yields a kernel matrix. Elements of the kernel matrix approximate inner-products between samples in the target embedding.

The kernel matrix merges the nullspaces of subset parameterizations on the set of samples.

Two basis are associated with the subset parameterization $X_m$ 130:

$P_m \doteq \text{span}([1, X_m^T]) \in \mathbb{R}^{k \times (d+1)}$ is an orthogonal basis of the rowspace of the subset parameterizations $X_m$ and translations thereof; and $Q_m \doteq \text{null}(P_m^T) \in \mathbb{R}^{k \times (k-d-1)}$ is an orthogonal basis for a complementary nullspace.

Together, the two basis satisfy $$X_m[P_m, Q_m] = [X_m, 0] \text{ and } [P_m, Q_m]^T[P_m, Q_m] = I,$$

which is an identity matrix. The basis $P_m$ spans the range of affine (linear plus translation) functions of the samples $X_m$, and the basis $Q_m$ spans the range of nonaffine functions of $X_m$, equivalently, nonlinear functions of $[X_m^T, 1]^T$.

The intrinsic coordinates of the set of samples project exclusively onto the basis $P_m$. The extrinsic curvature of the set of samples projects exclusively onto the basis $Q_m$. Thus, when the subset parameterizations are consistent with isometry, i.e., the parameterizations can be assembled into a globally consistent parameterization $Y_{iso}$ of the entire set of samples using nothing but rigid transforms on the subsets, then any subset taken from the parameterization $Y_{iso}$ has a zero projection onto the corresponding local nullspace $Q_m$.

Equivalently, $Y_{iso}$ lies in the nullspace of a union of nullspaces:

$$Y_{iso}[F_1Q_1, \ldots, F_MQ_M] = 0,$$

where an indicator matrix $F_m \in \{0,1\}^{N \times (k+1)}$ has $(F_m)_{ij}=1$ if the $i^{th}$ sample is represented by the $j^{th}$ point of the $m^{th}$ subset.

This nullspace constraint is the basis of the error measure described in Brand, "*Charting a manifold*," Advances in Neural Information Processing Systems, volume 15, 2003. That nullspace constraint can yield perfect immersions given perfect local parameterizations. However, if there are local parameterization errors, the least-squares problem associated with the nullspace constraint distributes error according to graph coverage.

In contrast to the prior art, the invention distributes the error evenly across the entire set of sampled points, as is desirable for a minimum squared error solution.

The averaging step 140 accomplishes the even distribution of the error by generating a linearizing operator, $$K \doteq \left(\sum_m F_m(I - P_m P_m^\top) F_m^\top diag(m_m)\right) diag(M1)^{-1},$$

that has the following properties:

Spectral Radius

The operators $K$ and $I-K$ are positive semidefinite with eigenvalues in the range [0, 1]. The linearizing operator $K$ is a weighted average of idempotent orthogonal projectors, and $I$ is the identity matrix.

Linearization

A product $YK$ isolates the component of any global parameterization $Y$ that is not affine to the subset parameterizations 131, averaged 140 over the subsets. A projector $Q_m Q_m^T = I - P_m P_m^T$ isolates the component of $YF_m$, i.e., points in the $m^{th}$ subset of $Y$, that is not affine to the subspace parameterizations $X_m$. For each sample, the diagonal matrices make a weighted average of these errors, averaged over the subsets.

The error of a global parameterization $Y$ is defined as the Euclidean norm of its non-affine component, $\|YK\|_F = \mathrm{trace}(YKK^T Y^T)^{1/2}$. A transform $X \to X(I-K)$ attenuates the component of the parameterization $X$ that is locally orthogonal to the set of samples, i.e., noise and, on the subset scale, extrinsic curvature.

Repeated transforms $X \to X(I-K)^n$ 'smooth' and 'unroll' the sampled points by making the sampled points closer and closer to rank-d in larger and larger neighborhoods.

Ultimately, the parameterization lies in an error-minimizing affine subspace $Y = \mathrm{argmin}_{YY^T=I}\mathrm{trace}(YKK^T Y^T)$, having rows with d+1 left singular vectors of the linearizing operator $K$ associated with minimal singular values. Under perfect local isometry, this is the exact nullspace of the operator $K$. Because the linearizing operator $K$ is invariant to global translations of the immersion, the nullspace contains a constant vector $1$, and therefore $Y^T = [1, Y_{aff}^T]$.

One way to isolate $Y_{aff}$ is to invert the spectrum of $KK^T$ and then remove any variance associated with translations. Using a centering matrix $T \doteq I - 1/N 11^T$, the GNA kernel is $T(I-KK^T)T = T - KK^T$ and its PCA is $$Y_{aff} \doteq \arg\max_{YY^T=I} \mathrm{trace}(Y(T - KK^T)Y^T).$$

The parameterization $Y_{aff}$ is maximally affine to the set of samples everywhere. Further, under the following conditions, the affine map to the manifold $\widehat{x_i - \bar{x}}$ is the same for all subsets.

Coordination

If the set of samples allows an isometric immersion $Y_{iso}$ in $\Re^d$ upon which the subsets are globally rigid, and every subset parameterization $X_m$ is affine to its d-dimensional subset, then parameterization $Y_{iso}$ lies in the subspace spanned by $Y_{aff}$.

By definition, any immersion drawn from the row-space of $Y_{aff}$ is minimally nonaffine to all subset parameterizations $\{\bar{X}^m\}_m^M$ and the corresponding subsets of samples, and is perfectly affine if all samples $X_m$ are consistent with an isometric immersion. To show that $Y_{aff}$ spans an isometric immersion, recall that global rigidity implies that the affine maps, taking any two subsets in $Y_{aff}$ to their corresponding subset parameterizations in $Y_{iso}$, are fully constrained with respect to each other.

Consider any two subsets in $Y_{aff}$ that share points. If their affine maps to $Y_{iso}$ differ, then the kernel $KK^T$ must admit an immersion, which is a nonlinear function of the shared points, which is a contradiction. Therefore all subsets must share the same affine map from $Y_{aff}$ to $Y_{iso}$, making $Y_{aff}$ globally affine to $Y_{iso}$.

Note that a manifold of samples that is locally isometric to $\Re^d$ does not necessarily have an embedding, i.e., a topology-preserving map from $\widehat{x_i - \bar{x}}$, or locally isometric immersion in target space $\Re^d$. It may have either, neither, or both. For example, objects such as lampshades, Moebius strips, and corkscrew ramps are bounded $\Re^3$ submanifolds that are locally isometric to $\Re^2$, but they cannot be flattened without distortion, folding, and self-crossings, respectively.

The invention embeds the lampshade with smooth distortion, immerses the Moebius strip with a fold, and isometrically immerses the ramp with self-crossings. In cases such as the lampshade, the nullspace averaging ensures that each point is minimally displaced from a subset having a parameterization that is linear in the corresponding subset.

The coordination may also be due to errors in overlapping local parameterization that make them inconsistent. However, because the invention averages constraints on samples rather than summing constraints over subsets as in the prior art, the immersions according to the invention are faithful to the samples in the following sense.

MMSE

The parametrization $Y_{aff}$ has a minimum squared error with respect to the average local parameterization of each sample relative to its neighbors.

In sum, the kernel $KK^T$ is distinguished in that it does not allow the embedding to be a nonlinear function of the local parameterizations, as is possible in other local methods such as LLE, HLLE, and Laplacian Eigenmaps, which employ subsets or approximations, nor does the kernel distribute distortion errors preferentially to points that have a low degree in the subsets.

The actual isometry $Y_{iso} = AY_{aff}$ is found by solving for a linear snear $A \in \Re^{d \times d}$ that makes all subset parameterizations isometric to their corresponding subsets. $A$ is a shear because isometry is invariant to rotation and translation.

To factor these out, let $\bar{X}_m$ be a centered subset parameterization on the set of samples 111 and let $\bar{Y}_m$ be a set of coordinates from $y_{aff}$ for the same subset, centered and rotated into alignment with $\bar{X}_m$ via the Procrustes method § 12.4.1 as described by Golub, et al., in "*Matrix Computations*," Johns Hopkins, third edition, 1996. Then, the least-squares estimate of the shear is $A = (X_S Y_S^T)(Y_S Y_S^T)^{-1}$ with $Y_S \doteq [\overline{Y}_a D_a, \overline{Y}_b D_b, \ldots]$, $X_S \doteq [\overline{X}_a D_a, \overline{X}_b D_b, \ldots]$, where $D^m \doteq \text{diag}(F_m^T m_m)\text{diag}(F_m^T M1)^{-1}$ duplicates the error averaging of the kernel. The left singular vectors of K are also the eigenvectors of an implied graph Laplacian operator $L=KK^T$. In this view they provide a harmonic basis for deformations of the immersion. Low-frequency modes allow for large-scale curvature of the data while high-frequency modes allow for local distortions such as noise. Left eigenvectors of K have essentially the same structure, thus thresholding the eigenvalues of I−K to 0 and 1 produces an operator that filters high-frequency artifacts such as noise while preserving the ambient shape of the sampled set.

Generalization

NLDR is useful to signal processing when new samples can be mapped between the high-dimensional ambient space and low-dimensional target space. Out-of-sample extensions give the immersion of a new sample that is constrained by known samples, but not vice versa, see, e.g., Bengio, et al., "*Out-of-sample extensions for LLE, Isomap, MDS, eigenmaps, and spectral clustering*," Advances in Neural Information Processing Systems, volume 15, 2003.

The basic idea is to determine a vector containing a kernel inner product of a new sample with all original samples, and project the sample onto the eigenvectors of the original immersion.

The application of this idea to the invention leads to a simple solution:

Let K' be a linearizing operator generated as described above, but for a subset matrix $[x, x_i, x_j, \ldots]$, where $x \in \Re^D$ is the new sample and $\{x_i, x_j, \ldots\} \subset X$ are the original samples that belong to subsets that the new sample x will join. The operator K' is generated using the same subset parameterization functions $f_m: \Re^D \to \Re^d$ as used for the original operator K, but these functions are also applied to x. The immersion of x is $$y \in \mathbb{R}^d = -[0, y_i, y_j, \ldots](K'k'_1^T/\|k'_1\|^2)$$

for $\{y_i, y_j, \ldots\} \subset Y_{iso}$ and $k_1'$, the first row of K'. If the new sample is assigned to just one subset $X_m$, then the immersion reduces to an affine regression.

The same idea can be used for denoising samples in the ambient space, assuming that $f_m(\cdot)$ is pseudo-invertible to yield samples on a surface tangent to $\widehat{x-\overline{x}}$. The ambient Euclidean distance from a denoised sample x' to $f_m^{-1}(f_m(x))$ is $$\|x'-f_m^{-1}(-[0, X_m](Q'_m q'_{m1}^T/\|q'_{m1}^T\|^2))\|,$$

where $q'_{m1}$ is the first row of $Q'_m$, an orthogonal basis of null$([1, [f_m(x), X_m]^T])$. Just as X(I−K) denoises the original data by averaging subset constraints on each sample, we can average the backprojections $f_m^{-1}(\cdot)$ over all subsets containing x to obtain a least-squares estimate of denoised x'. If $f_m(m)$ is an orthogonal projection, then this scheme reduces to the familiar form $X' = -[0, x_i, x_j, \ldots](K'k'_1^T/\|k'_1\|^2)$, which shows that the out-of-sample-set extensions for denoising and immersion are consistent under first-order assumptions. This scheme can also be used to map samples from the target space to the ambient space.

It is also possible to treat a new sample as information about the set of samples that could change the immersion of the entire set. Taking advantage of near-linear-time updating schemes for eigenvalue decomposition (EVD) such as Lanczos rank-1 updating, samples and subsets can be added or modified without having to start at the beginning with a new sampling 110, because updating constraints on k points requires at most 2k rank-1 updates to the EVD.

The new error matrix is K+J, where J has k nonzero columns corresponding to the affected samples. Knowing the EVD of $T-KK^T$, the EVD of $T-(K+J)(K+J)^T = T-KK^T-(KJ^T+JK^T)-JJ^T$ is determined.

The span of the parenthesized summand is the combined span of the nonzero columns of J and the corresponding columns of K. Therefore the summand has rank 2k at most, and includes $JJ^T$ in its span. To reduce the update to a series of rank-1 updates, the summands are decomposed into eigenpairs. This can be done by orthogonalizing [J,K] to get a subspace basis, projecting the summands into this subspace, performing an EVD of the resulting 2k×2k symmetric matrix, and using the eigenvectors to counter-rotate the basis. The resulting basis vectors and eigenvalues are then used for sequential rank-1 updates of the immersion EVD.

Sample Set Complexity

If K is generated using a subspace of the each local nullspace $Q_m$, then the immersion might not be fully determined, because K is invariant to local distortions. This leads to a simple but useful insight about subset size, which determines the dimension of the nullspace. For a d-dimensional immersion, one needs at least $k \geq d+2$ samples to construct a nonempty local nullspace and a further $$\binom{d+1}{2} - 1$$

samples for an estimator of the local Hessian to be contained in the span of the nullspace, for a total of $$k \geq \binom{d+2}{2}$$

samples.

Thus, to eliminate nonlinearities up to second order, any local NLDR method that compares prospective immersions to local parameterizations requires subset sizes of $k=0(d^2)$ points. That does not exclude the possibility that using fewer samples or incomplete nullspace constraints will lead to an immersion with low distortion, because rigidly overlapping subsets are generally subject to a union of their constraints. The invention works well on data manifolds with dense subset coverage, even when $k=d+2$.

Sample Weighting

Immersions can have errors due to sampling noise, numerical error, and local parameterization errors. With the invention, errors associated with perturbing a sample decline quadratically with its distance from the center of each subset in which it is included. In particular, consider the unweighted nullspace projection error $\|YF_m Q_m Q_m^T\|$ of global parameterization Y with respect to the $m^{th}$ subset. Let immersion point $y_i \in Y$ correspond to subset point $x_i \in X_m$. The error associated with perturbing either point declines quadratically with the distance of $x_i$ from the subset center, denoted $\overline{X_m}$:

Perturbations of $y_i$ or $x_i$ cause $\|YF_m Q_m Q_m^T\|_F$ to vary as $0 < a - b\|x_i - \overline{X_m}\|^2$ for some constants a, b>0 independent of i.

Let $P_m$ be an orthogonal basis of the columnspace Of $[1, X_m^T]$. Let the first column of $P_m$ be constant. By orthogonality, all other columns must sum to zero and are thus linear transforms of centered $X_m$. Consequently values in the $i^{th}$ row of $P_m$ are linear in $(x_i - \overline{x_m})$, and the $i^{th}$ element on the diagonal of projector $P_m P_m^T$ is quadratic in $\|x_i - \overline{x_m}\|$. The norm of the inner product of Y with $Q_m Q_m^T = I - P_m P_m^T$ therefore varies linearly with $-\|x_i - \overline{x_m}\|^2$. Small perturbations $\Delta x_i$ of $x_i$ cause the norm to vary with $$-\left\|x_i + \frac{k-1}{k}\Delta x_i - \overline{x_m}\right\|^2 \approx \|x_i - \overline{x_m}\|^2.$$

Thus, nullspace projectors are naturally more tolerant to errors at the periphery of a subset, and immersions are determined more by central points than by peripheral points.

However, there are conditions under which such a tolerance is not enough. For example, if the set of samples is locally a second-order algebraic surface, e.g., parabolic, hyperbolic, or elliptic, then the error in the parameterization by linear projection onto the tangent space estimate grows as $O(\|\widehat{x_i - \bar{x}}\|\text{hu } 3)$, with $\|\widehat{x_i - \bar{x}}\|$ being the distance of $x_i$ to the subset mean in the tangent space. Thus for locally linear models one may profitably adjust the subset weights $M_{mn}$ to further discount errors associated with peripheral samples.

Local Isometric Parameterizations

NLDR uses Euclidean distances in the ambient space as a proxy for geodesic distances on the manifold, but that is a biased approximation that always underestimates true distances. Wherever manifolds of samples curve away from their tangent spaces, a locally linear view of the manifold induces a "fish-eye" distortion that causes the global parameterization to contract in places and directions where the manifold has high extrinsic curvature. With finite data, it is impossible to define a subset size that eliminates the distortion, and many NLDR methods require large subsets, for rigidity or stability, that exacerbate the distortion problem.

Local distortions can be substantially reduced and sometimes eliminated entirely by modelling subset curvature with quadratic functions. The invention models subset curvature to yield exact isometric parameterizations of quadric manifolds that are products of planar quadrics (PPQ), i.e., manifolds defined as products of parabolic, elliptic, hyperbolic, and straight plane curves.

For example, generalized cylinders and minimal isometric immersions of d-torii are locally PPQ embeddings of intrinsically flat manifolds of samples. When a manifold is not locally PPQ, the PPQ model is essentially a mixed first- and second-order approximation, the second-order terms being fitted in the directions of where the manifold exhibits greatest curvature. The benchmark NLDR "Swiss roll" problem is the product manifold of an Archimedes spiral and a line segment; to second order the spiral $f(\theta) = (\theta \cos\theta, \theta \sin\theta)$ is elliptic for $\theta < \pi/2$, parabolic at $\theta = \pi/2$, and hyperbolic for $\theta > \pi/2$.

Consider a local neighborhood around sample $P \in \widehat{x_i - \bar{x}} \subset \mathbb{R}^k$ in which the ambient embedding of d-dimensional set of samples is locally quadric and has extent in a 2d-dimensional affine subspace spanned by an orthogonal basis $T_p \in \mathbb{R}^{D \times 2d}$. Clearly, such a neighborhood exists and supersets the infinitesimal neighborhood in which the set of samples is locally linear around p. In this neighborhood, the set of samples can be fitted by a quadric hypersurface $Q_p \subset \mathbb{R}^D$ of dimension $2d-1$ having matrix equation $x'^T F_p x' = 0$ for symmetric $F_p$ and local homogeneous coordinates $x' \doteq [(x-p)^T T_p, 1]^T \in \mathbb{R}^{2d+1}$. Strictly speaking, in this neighborhood, the set of samples is a submanifold of $Q_p$. Of practical import is the fact that the surface $Q_p$ is a good local approximation of the set of samples over a much larger area than any linear model. The main result is that local PPQ decomposition and isometric parameterization of the set of samples can be determined as described below.

PPQ

If d-dimensional set of samples is locally a product of planar quadrics, then $F_p$ and its PPQ decomposition are recoverable with probability 1 from $O(d^2)$ random samples spanning $T_p$.

The essence of the constructive proof is that $F_p$ has a canonical form that reveals the pairing of dimensions into planar quadrics. The planar quadrics can then be independently integrated for arc-length, giving a true geodesic parameterization.

Empirically, a quadric is fitted to multivariate data via a matrix B containing the scatter of all the pairwise products of the ordinates of x': $B_{pq} = \Sigma_i x'_{pi} x'_{qi}$ where $x'_{pi}$ is the $p^{th}$ element of homogeneous sample $x'_i$. The minimizing eigenvector of symmetric nonnegative definite B contains the elements of quadric equation coefficient matrix $F_p$, while the associated eigenvalue gives the sum squared error of the fit, such that $\Sigma_i x_i^T F_p x'_i = \lambda_{min}(B)$.

Because this is a linear system of $$x'^T F_p x' = \sum_j^{2d} q_j(z_j) + c \doteq \left( \sum_j^{2d} a_j z_j^2 + b_j z_j \right) + c = 0, \quad (1)$$

unknowns, the sample complexity is $O(d^2)$. A partial EVD diagonalization $$\binom{2d+1}{2}$$

gives a subspace rotation inside $T_p$ such that Q is expressed as a sum of quadratic functions $q_j(\cdot)$, one in each dimension:

$$\begin{bmatrix} V & 0 \\ 0 & 1 \end{bmatrix}^t F_p \begin{bmatrix} V & 0 \\ 0 & 1 \end{bmatrix} = \begin{bmatrix} diag(a) & b/2 \\ b^\top/2 & c \end{bmatrix} \quad 1.$$

where $z \doteq [z_1, \ldots z_{2d}]^T = V^T T_p^T (x-p)$ for $a_j \in a$ and $b_j \in b$. This diagonalization is unique up to possible multiplicity in the eigenvalues $a_j \in a$.

First consider the case where all eigenvalues are distinct. If the set of samples is locally PPQ, then any one of its constituent planar curves must be expressed as the linear combination of two of Q's quadratic summands, e.g., $r_i q_i(z_i) + q_j(z_j) + c_j = 0$ for $r_i \in \mathfrak{R} \setminus 0$ and $c \in \mathfrak{R}$ becaus the EVD gives the only orthogonal basis that eliminates all pairwise products $z_i z_j$ that couple the dimensions multiplicatively. All of the dimensions are coupled additively. If the set of samples is locally PPQ, then the 2d quadratic summands must be paired off to form d orthogonal independent quadrics, each specifying a 1D curve in an $\mathfrak{R}^2$ subspace spanned by a pair of the eigenvectors in V.

Therefore, the set of samples is locally a submanifold of Q. The pairing can be determined from data because the vector of values of each summand $q_i$, iterated over all samples, is a 1D affine transform of the value vector of its paired summand $q_j$. To find satisfying pairs, a linear regression is fully determined when the summand vectors are linearly independent in $\mathfrak{R}^{2d}$, requiring at least 2d samples.

To handle eigenvalue multiplicities, recall that the m eigenvectors $\{vi, vj, \ldots\} \subset V$ associated to a repeated eigenvalue $\{a_i=a_j= \ldots\} \subset a$ are determined only up to an $\Re^m$ mutual rotation. Local PPQ structure of the set of samples implies that there exists a rotation of these eigenvectors and the linear coefficients $\{b_i, b_j, \ldots\}$ such that the associated quadratic summands can be paired off with each other or with summands of other eigenvalues. There are four causes and resolutions of multiplicity:

Each parabola contributes an $a_j \neq 0$ for its abscissa and an $a_i=0$ for its ordinate, thus ordinates of all parabolas are rotated together in the nullspace. The rotation can be recovered by regressing the corresponding summand value vectors onto those of nonzero $a_j$;

Each independent linear dimension contributes a summand with $a_i=b_i=0$. These dimensions constitute the remainder of the nullspace after parabolic dimensions are removed via pairing;

Each perfect circle contributes a pair $a_i=a_j \neq 0$. Being a circle, the pairing is revealed by the multiplicity and invariant to rotation of the associated eigenvectors; and An accidental multiplicity, with $a_j=a_k$ being parameters from two independent planar curves, is possible because each planar pair can be arbitrarily weighted in the quadratic form F. This implies that a scatter matrix B has a d-dimensional null space of equivalent F parameterizations. In that space the subset of parameterizations having accidental multiplicities has dimension<d and thus measure zero. Therefore the pairing is fully determined with probability 1.

PPQ manifolds have straightforward isometric parameterizations. Because a locally product manifold is locally isometric to the product of its totally geodesic submanifolds, a PPQ manifold is isometric to the product space of arc-length parameterizations of each quadric.

Figure 2:
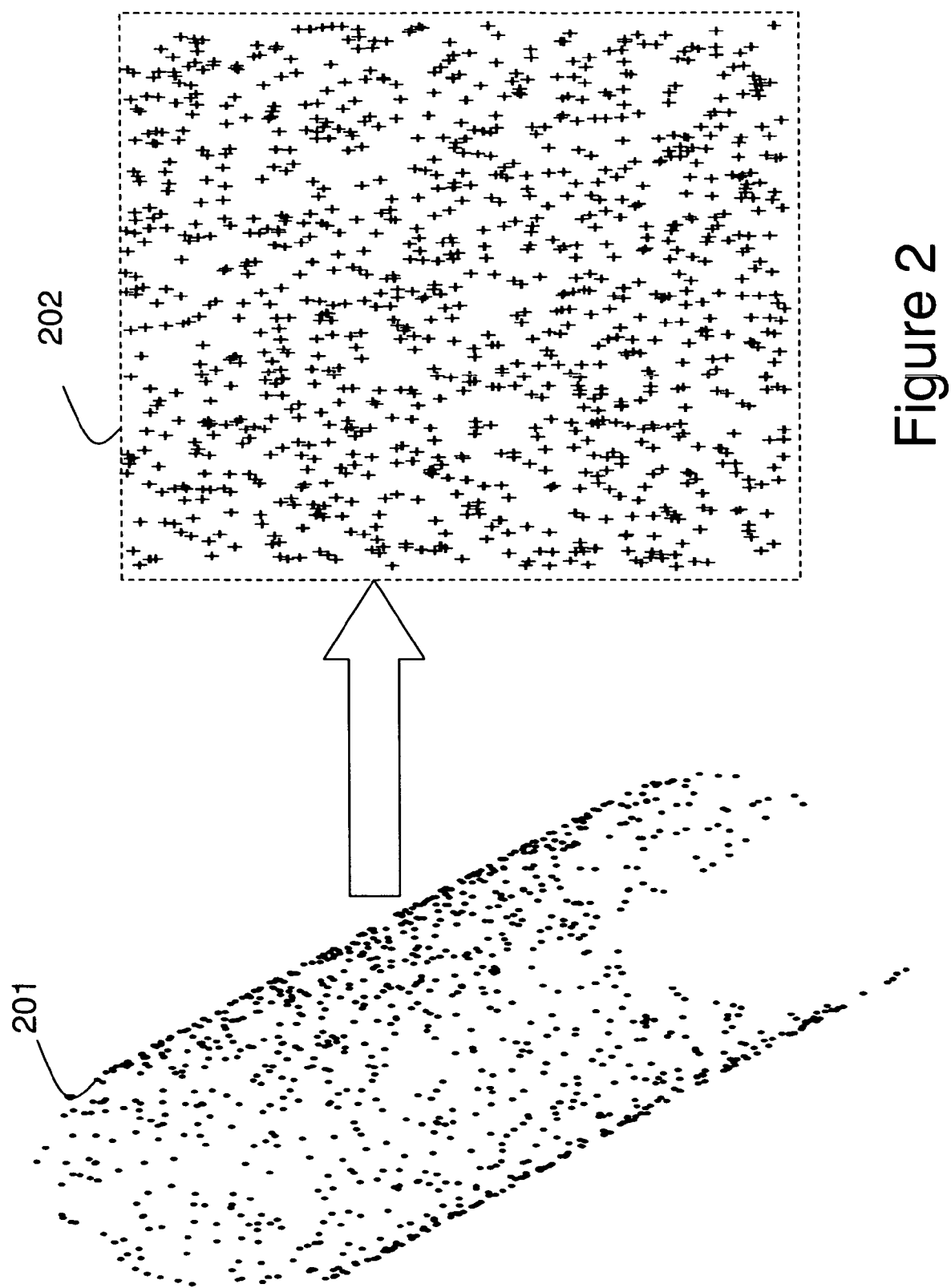
FIG. 2 is a schematic of a mapping of samples according to the invention.

As shown in FIG. 2, if the set of samples is globally PPQ, e.g., an open cylinder 201 in $\Re^3$, then this procedure can parameterize 202 the entire set of samples. Parabolas and circles offer straightforward analytic formulae for arc-length parameterizations.

Not all intrinsically flat manifolds are locally PPQ, e.g., a cone in $\Re^3$ is not a product manifold. In fact, the PPQ decomposition is trivially extended to cones by considering all triplets of quadratic summands from diagonalized $F_p$, i.e., a cone is represented as three summands that have a constant empirical sum and quadratic coefficients of varied sign. The decomposition remains well-defined because cones do not present any additional source of eigenvalue multiplicity. The remaining class of developable surfaces in $\Re^3$, tangent surfaces of space curves, are not quadric but have piecewise conic approximations that are sufficiently accurate for industrial applications.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for representing a class of objects, comprising:
    acquiring a set of samples for the objects in the class, there being one sample for each object, and each sample includes a plurality of data values representing characteristics of the object;
    grouping the samples into subsets such that each subset intersects at least one other subset;
    determining, for each subset, a low-dimensional subset parameterization; and
    averaging nullspaces of the low-dimensional subset parameterizations to obtain a matrix having a nullspace containing a low-dimensional representation of the class of objects.

2. The method of claim 1, further comprising:
    reducing noise in the set of samples by determining a difference between the set of samples and the nullspace containing the low-dimensional representation of the class of objects.

3. The method of claim 1, further comprising:
    mapping a column nullspace of the matrix to the subset parameterizations to generate the low-dimensional representation of the class of objects.

4. The method of claim 1, further comprising:
    acquiring a next set of samples for the objects in the class;
    grouping the next samples into next subsets;
    determining, for each next subset, a low-dimensional subset parameterization;
    averaging nullspaces of the low-dimensional subset parameterizations of each next subset and each subset intersecting a next subset, to obtain a filter; and
    filtering the set of samples and the next set of samples to update the representation of the class of objects.

5. The method of claim 1, in which the samples are images of human faces.

6. The method of claim 1, in which the samples are models of human faces.

7. The method of claim 1, further comprising:
    rendering the representation on an output device.

* * * * *